US010598334B2

(12) United States Patent
Ishizaka

(10) Patent No.: US 10,598,334 B2
(45) Date of Patent: Mar. 24, 2020

(54) VEHICLE LAMP

(71) Applicant: STANLEY ELECTRIC CO., LTD., Tokyo (JP)

(72) Inventor: Kazuyo Ishizaka, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/040,176

(22) Filed: Jul. 19, 2018

(65) Prior Publication Data

US 2019/0023176 A1 Jan. 24, 2019

(30) Foreign Application Priority Data

Jul. 24, 2017 (JP) ................................. 2017-142598

(51) Int. Cl.

| | |
|---|---|
| ***F21S 43/241*** | (2018.01) |
| ***B60Q 1/26*** | (2006.01) |
| ***F21K 9/238*** | (2016.01) |
| ***F21V 23/00*** | (2015.01) |
| ***F21K 9/232*** | (2016.01) |
| ***F21S 43/14*** | (2018.01) |
| ***F21S 43/40*** | (2018.01) |
| ***F21S 43/243*** | (2018.01) |
| ***F21V 8/00*** | (2006.01) |
| ***F21S 43/31*** | (2018.01) |
| ***F21S 43/247*** | (2018.01) |
| *F21Y 115/10* | (2016.01) |

(52) U.S. Cl.

CPC .......... *F21S 43/241* (2018.01); *B60Q 1/2696* (2013.01); *F21K 9/232* (2016.08); *F21K 9/238* (2016.08); *F21S 43/14* (2018.01); *F21S 43/243* (2018.01); *F21S 43/247* (2018.01); *F21S 43/315* (2018.01); *F21S 43/40* (2018.01); *F21V 23/005* (2013.01); *F21V 23/006* (2013.01); *G02B 6/0001* (2013.01); *G02B 6/002* (2013.01); *G02B 6/0018* (2013.01); *F21Y 2115/10* (2016.08); *G02B 6/0045* (2013.01)

(58) Field of Classification Search

CPC ... F21S 43/239; F21S 43/241; F21V 2200/20; B60Q 1/0011

See application file for complete search history.

(56) References Cited

U.S. PATENT DOCUMENTS

2012/0250308 A1* 10/2012 Zwak .................. G02B 6/0018 362/235
2019/0203905 A1* 7/2019 Ichinohe ............... F21S 43/239

FOREIGN PATENT DOCUMENTS

JP 2017021963 A 1/2017

* cited by examiner

*Primary Examiner* — Sean P Gramling
(74) *Attorney, Agent, or Firm* — Kenealy Vaidya LLP

(57) ABSTRACT

A vehicle lamp includes a light source, and a light guide body, wherein the light guide body has a first light guide section disposed to have one surface facing the light source, and a second light guide section formed to protrude from a second end surface and a third end surface of the first light guide section, the first light guide section includes an incidence section, a first reflective section provided on a surface facing the incidence section, a second reflective section and a third reflective section provided on an end surface that constitutes a profile of the first light guide section.

9 Claims, 5 Drawing Sheets

VEHICLE LAMP

CROSS-REFERENCE TO RELATED APPLICATION

Priority is claimed on Japanese Patent Application No. 2017-142598, filed Jul. 24, 2017, the content of which is incorporated herein by reference.

BACKGROUND

Field of the Invention

The present invention relates to a vehicle lamp.

Description of Related Art

In the related art, a configuration in which a light source such as a light emitting diode (LED) or the like and a light guide body such as an inner lens or the like are combined is known as a vehicle lamp mounted on a vehicle (for example, see Japanese Unexamined Patent Application, First Publication No. 2017-21963).

In the vehicle lamp, during the light emitted from the light source is caused to enter from one end surface (an incidence surface) of the light guide body and the light is guided inside of the light guide body, a light emission surface (a light emitting surface) formed on one surface (a front surface) of a light guide body is made to substantially uniformly emit the light while internally reflecting the light with a plurality of reflection cuts (reflective surfaces) formed on the light guide body and while diffusing the reflected lights reflected by each of the reflection cuts. The above-mentioned vehicle lamp is used in, for example, a tail lamp or the like of the vehicle.

SUMMARY OF THE INVENTION

Incidentally, in the above-mentioned light guide body, luminance (emission) unevenness has occurred on the light emitting surface due to a difference in an optical path length of light guided from the incidence surface to the light emission surface (the light emitting surface). That is, when the luminance (emission) unevenness has occurred on the light emission surface (the light emitting surface) of the light guide body, in the light emitting surface, a place in which an optical path length from the incidence surface is long gets relatively darker than a place in which the optical path length from the incidence surface is short.

In particular, in a case it is tried to uniformly emit the entire region of the light emitting surface by the light emitted from one light source, it is difficult to suppress occurrence of luminance (emission) unevenness due to the above-mentioned difference in the optical path lengths.

Meanwhile, when such luminance (emission) unevenness occurs, since visibility or appearance is decreased, it becomes necessary to provide a plurality of light sources and to make the light emitted from each of the light sources to enter the light guide body. In this case, problems such as increases in cost due to an increase in the number of the light sources, an increase in size of a lighting body due to securing a space for diposing the plurality of light sources, or the like occurs.

An aspect of the present invention is directed to providing a vehicle lamp that enables more uniform emission.

(1) A vehicle lamp of an aspect of the present invention includes a light source; and a light guide body configured to guide light from the light source, wherein the light guide body has a first light guide section disposed to have one surface facing the light source, and a second light guide section formed to protrude from an end surface that constitutes a profile of the first light guide section toward a side opposite to a side facing the light source, the first light guide section includes an incidence section formed on the one surface, a first reflective section provided on a surface facing the incidence section, a second reflective section and a third reflective section provided on the end surface, the second reflective section is formed on a first end surface that is a part of the end surface of the first light guide section and that is located at an end surface of the first light guide section disposed at a region different from a region the second light guide section is protruding, the third reflective section is formed on a second end surface and a third end surface that are a part of the end surface of the first light guide section and that are located at the region the second light guide section is protruding, the first end surface is disposed between the second end surface and the third end surface, the second light guide section is provided in a plate shape extending from the first light guide section toward a light emitted direction from the light source and includes a first light emission section provided on an end part of the second light guide section at a front side of the light emitted direction, the second reflective section includes a reflective surface that internally reflects a part of the light emitted from the light source, which is reflected at the first reflective section after entered inside of the first light guide section from the incidence section, toward at least one of the second end surface and the third end surface, the third reflective section includes a reflective surface that internally reflects a part of the light emitted from the light source, which is reflected at the first reflective section after entered inside of the first light guide section from the incidence section, toward the first light emission section through inside of the second light guide section, and the first light emission section serves as a light emitting surface.

(2) In the vehicle lamp, the second reflective section may have a first step section including a plurality of inclined surfaces configured to reflect some of the light that enters the first end surface toward the second end surface, and a second step section including a plurality of inclined surfaces configured to reflect some of the light entering the first end surface toward the third end surface.

(3) In the vehicle lamp, the second reflective section may have a shape in which a distance between the first step section and the second end surface and a distance between the second step section and the third end surface are gradually decreased in a direction from the incidence section toward the first end surface.

(4) In the vehicle lamp, the second light guide section may have a shape in which distances between the second end surface and the first light emission section and the third end surface and the light emission section are gradually decreased in the direction from the incidence section toward the first end surface.

(5) In the vehicle lamp, the distance may be adjusted such that optical path lengths of the light guided from the incidence section to the first light emission section are substantially equal.

(6) In the vehicle lamp, the light guide body may further comprise a third light guide section formed to protrude from an end surface consisting the profile of the first light guide section toward the side opposite to the side facing the light source, and a fourth reflective section provided at the end surface of the first light guide section, the fourth reflective section may be formed at a position different from where the first end surface is formed and may be formed at a fourth end surface located at a region where the third light guide section is protruding, the third light guide section may be formed in a plate shape extending from the first light guide section toward a light emitted direction from the light source and may include a second light emission section provided on an end part of the third light guide section at the front side of the light emitted direction, the second light guide section and the third light guide section may be integrally formed, and the first light emission section and the second light emission section may form a continuous light emitting surface.

(7) In the vehicle lamp, a plurality of reflection cuts may be formed on the first or second light emission sections.

(8) In the vehicle lamp, the second light guide section may be disposed above and below the light source in a front view of the vehicle lamp.

(9) In the vehicle lamp, the third light guide section may be disposed at side of the light source in the front view of the vehicle lamp.

According to the aspect of the present invention, it is possible to provide a vehicle lamp capable of emitting light more uniformly.

DETAILED DESCRIPTION OF THE INVENTION

Figure 1:
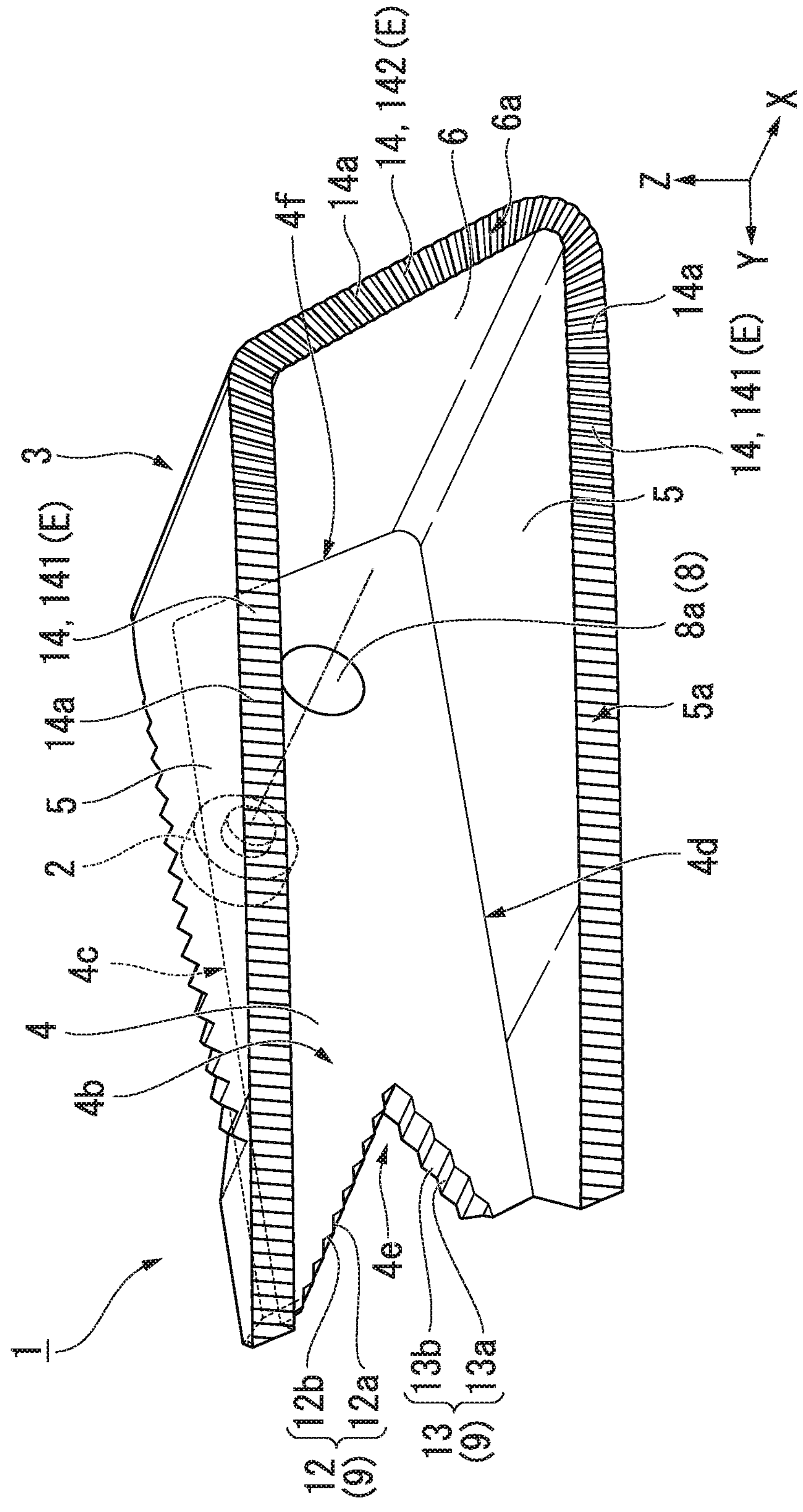
FIG. 1 is a perspective view showing a light guide body included in a vehicle lamp according to an embodiment of the present invention.

Hereinafter, an embodiment of the present invention will be described in detail with reference to the accompanying drawings.

Further, in the drawings used in the following description, for the convenience of illustration of components, scales of dimensions may be shown differently according to the components, and dimension ratios of the like of the components are not limited to being the same as those in actuality.

For example, a lighting tool 1 for a vehicle shown in FIG. 1 to FIG. 5B will be described as an embodiment of the present invention.

Figure 2:
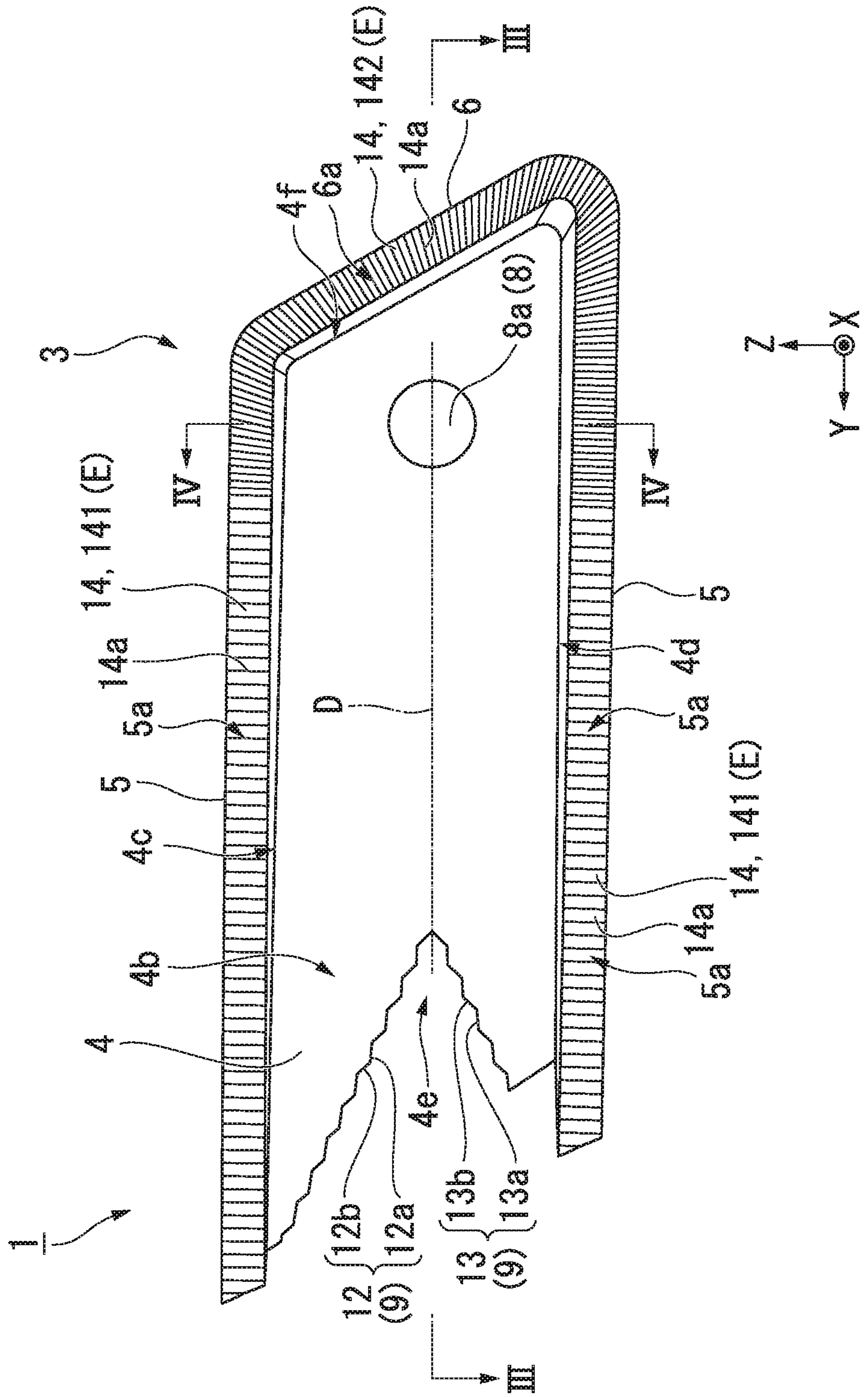
FIG. 2 is a front view of the vehicle lamp shown in FIG. 1 when seen from a front side.
Figure 3:
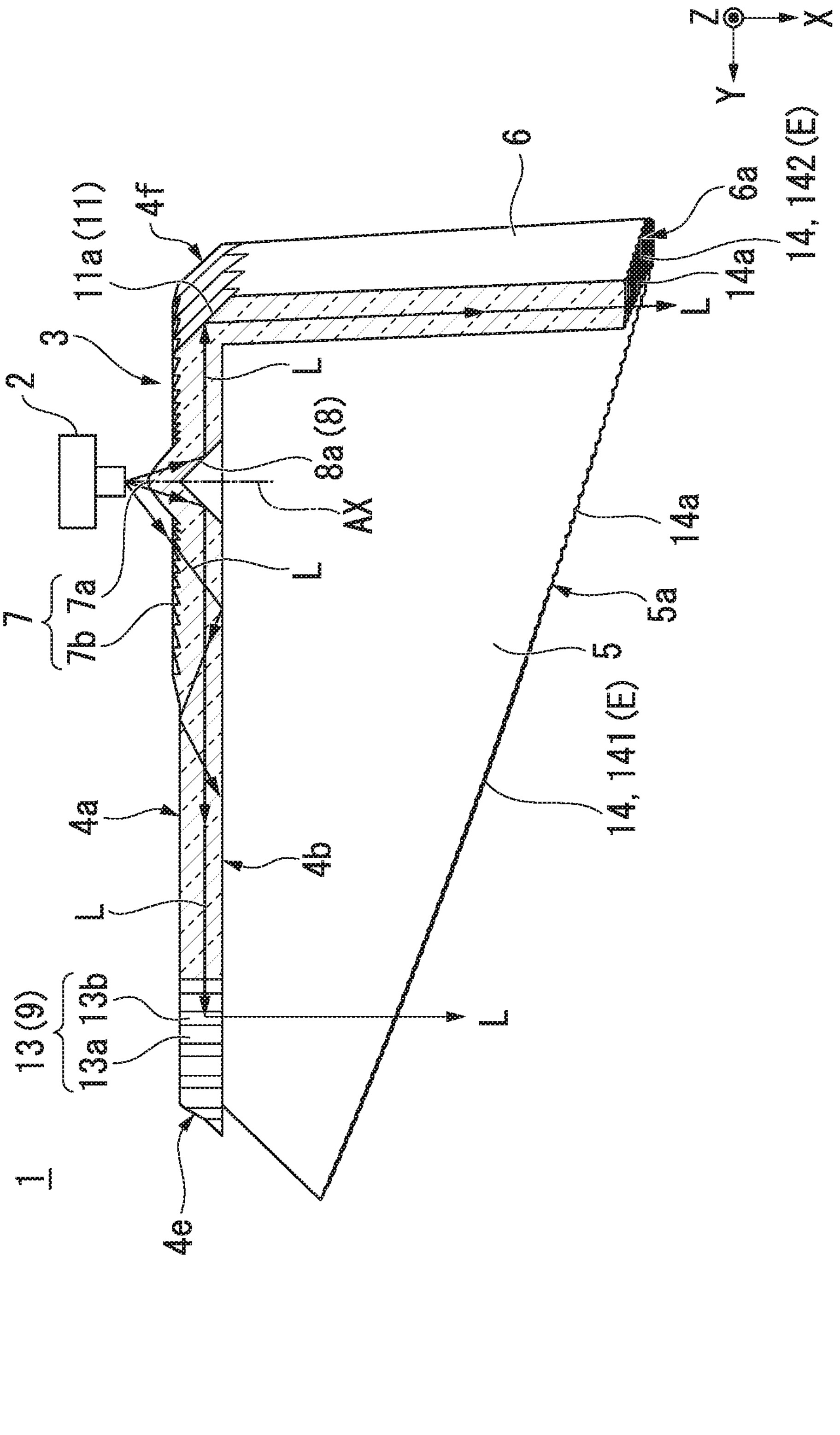
FIG. 3 is a cross-sectional view of the vehicle lamp taken along line III-III shown in FIG. 2.
Figure 4:
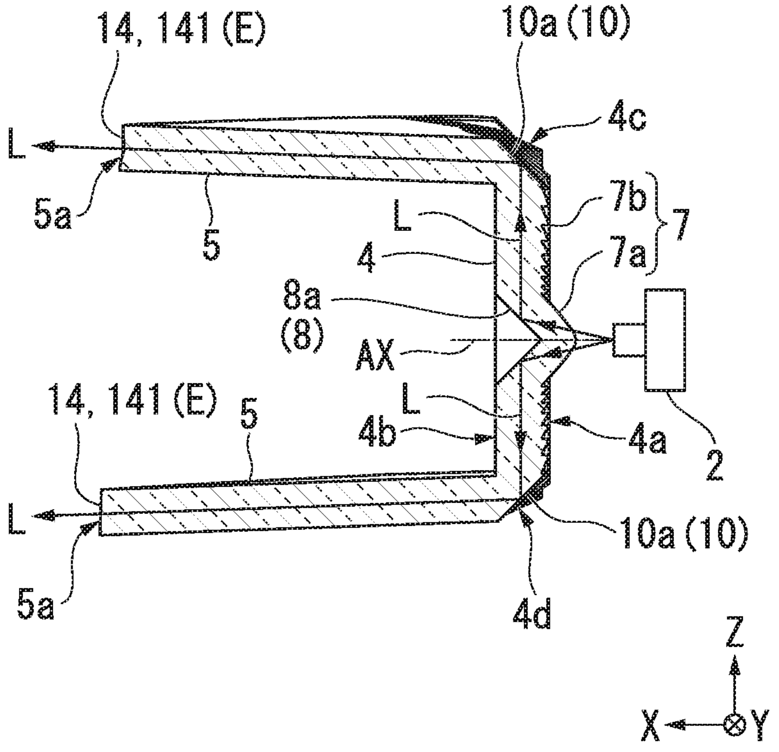
FIG. 4 is a cross-sectional view of the vehicle lamp taken along line IV-IV shown in FIG. 2.

Further, FIG. 1 is a perspective view showing a light guide body 3 included in the lighting tool 1 for a vehicle. FIG. 2 is a front view of the lighting tool 1 for a vehicle when seen from a front side. FIG. 3 is a cross-sectional view of the lighting tool 1 for a vehicle taken along line III-III shown in FIG. 2. FIG. 4 is a cross-sectional view of the lighting tool 1 for a vehicle taken along line IV-IV shown in FIG. 2.

Figure 5A:
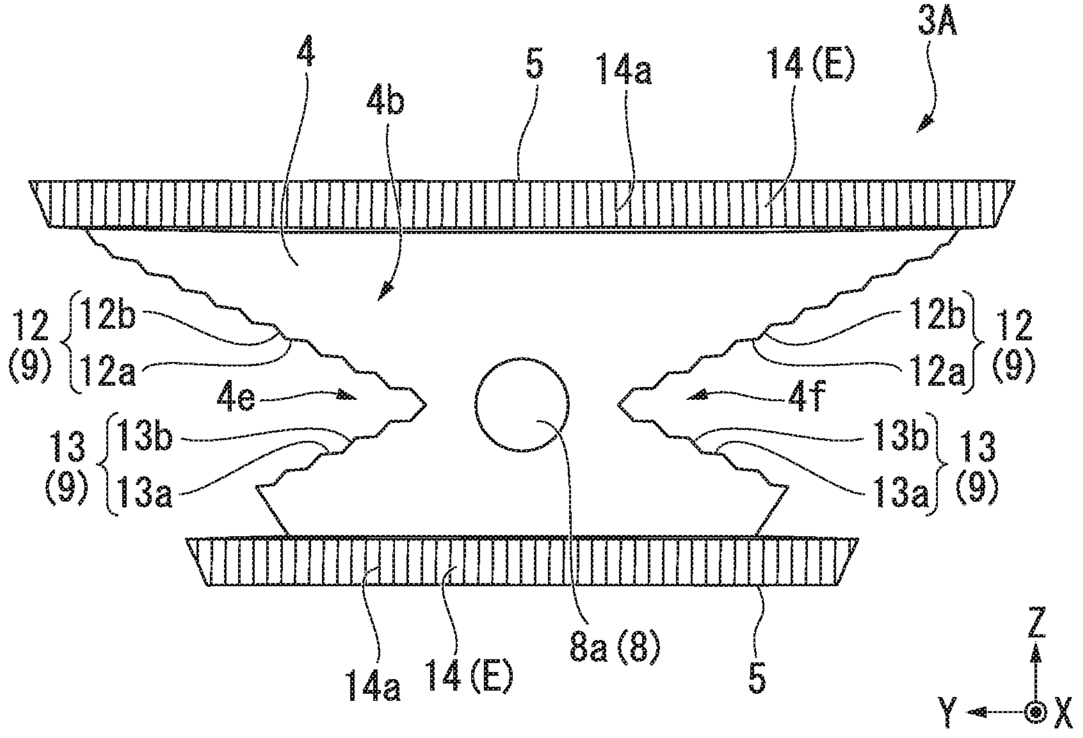
FIG. 5A is a front view showing a variant of a light guide body included in the vehicle lamp shown in FIG. 1.
Figure 5B:
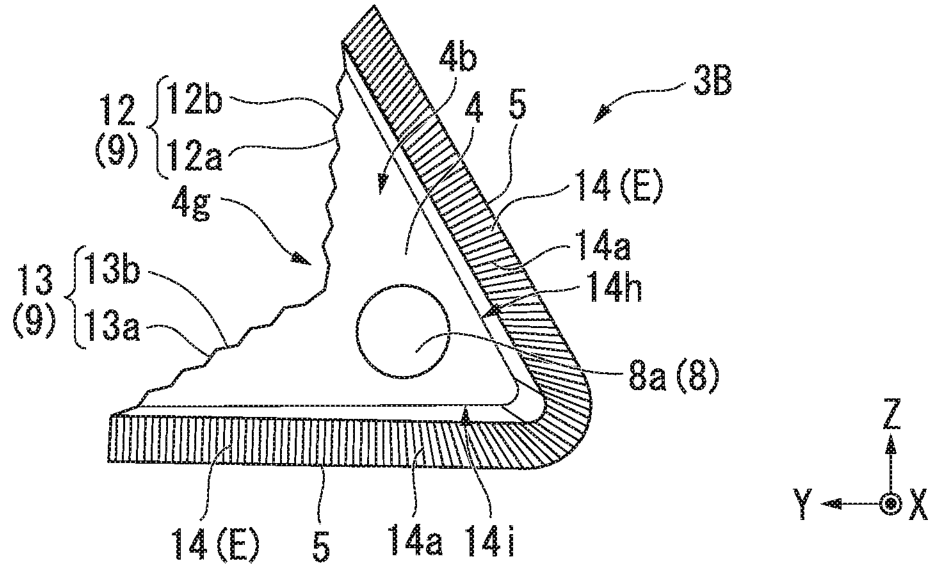
FIG. 5B is a front view showing the variant of the light guide body included in the vehicle lamp shown in FIG. 1.

FIG. 5A and FIG. 5B are front views showing a variant of the lighting tool 1 for a vehicle.

In addition, in the drawings described below, an XYZ orthogonal coordinate system is set, an X-axis direction shows a forward and rearward direction (a lengthwise direction) of the vehicle lamp, a Y-axis direction shows a leftward and rightward direction (a widthwise direction) of the vehicle lamp, and a Z-axis direction shows an upward and downward direction (a height direction) of the lighting tool 1 for a vehicle.

The lighting tool 1 for a vehicle of the embodiment is obtained by applying the present invention to, for example, tail lamps (tail lights) mounted on both corner sections on a rear end side (in the embodiment, a corner section on a left rear end side) of a vehicle (not shown).

Further, in the following description, "front," "rear," "left," "right," "upper" and "lower" indicate directions when the lighting tool 1 for a vehicle is seen from the front (rear side of the vehicle) unless the context clearly indicates otherwise. Accordingly, directions when the vehicle is seen from the front surface (front side of the vehicle) are directions obtained by inverting front, rear, left and right directions.

Specifically, as shown in FIG. 1 to FIG. 4, the lighting tool 1 for a vehicle generally includes a light source 2, and the light guide body 3 configured to guide light from the light source 2. The light source 2 and the light guide body 3 are disposed on the corner section of the left rear end side of the vehicle while being accommodated inside a lighting body (not shown) that constitutes the lighting tool 1 for a vehicle.

The light source 2 is constituted by a chip LED (SMDLED) configured to emit, for example, red light (hereinafter, simply referred to as light) L. In addition, a high output (high luminance) type vehicle lighting is used in the chip LED. The light source 2 radially emits the light L emitted from the chip LED forward (rear side of the vehicle).

The light guide body 3 has one first light guide section 4, two second light guide sections 5 and one third light guide section 6, which guide the light L emitted from the light source 2, as inner lenses of the lighting tool 1 for a vehicle. Further, a material having a higher refractive index than air, for example, a transparent resin such as polycarbonate, acryl, or the like, glass, and so on, may be used in the light guide body 3.

Among these, the first light guide section 4 is formed in a substantially rectangular plate shape as a whole, and is disposed in a direction parallel with respect to the upward and downward direction (the height direction). In addition, the first light guide section 4 is disposed such that a back surface (one surface) 4*a* faces the light source 2. Accordingly, the first light guide section 4 is disposed such that a front surface (the other surface) 4*b* is directed forward (rear side of the vehicle).

Meanwhile, the two second light guide sections 5 are formed to protrude from the end surfaces 4*c* and 4*d*, which are disposed on the upper and lower sides of the first light guide section 4, among four (upper, lower, left and right) end surfaces 4*c* to 4*f* that constitute a profile of the first light guide section 4, toward a side (rear side of the vehicle) opposite to the side facing the light source 2. In addition, the two second light guide sections 5 are formed in a substantially triangular plate shape as a whole and disposed parallel to each other in a direction parallel with respect to the leftward and rightward direction (the widthwise direction).

Meanwhile, the third light guide section 6 is formed to protrude from the end surface 4*f*, which is disposed on the right side of the first light guide section 4, toward a side (rear side of the vehicle) opposite to the side facing the light source 2. In addition, the third light guide section 6 is formed in a substantially rectangular plate shape as a whole and disposed in a direction vertically inclined to continue between the two second light guide sections 5. Further, corner sections between the two second light guide sections 5 and the third light guide section 6 have rounded shapes.

Accordingly, the light guide body 3 has a shape in which intermediate sections between the first light guide section 4 and the two second light guide sections 5 are folded at about 90° and an intermediate section between the first light guide section 4 and the third light guide section 6 is folded at about 90°. In addition, the light guide body 3 has a shape (a U shape) in which the two second light guide sections 5 and the third light guide section 6 continue to surround a periphery of the first light guide section 4 on the side of the front surface 4*b*.

The first light guide section 4 has an incidence section 7 formed on the back surface 4*a*, a first reflective section 8 formed on the front surface 4*b* facing the incidence section 7, a second reflective section 9 formed on the left end surface (hereinafter referred to as a first end surface) 4*e*, two third reflective sections 10 formed on the upper end surface (hereinafter referred to as a second end surface) 4*c* and the lower end surface (hereinafter referred to as a third end surface) 4*d*, and a fourth reflective section 11 formed on the right end surface (hereinafter referred to as a fourth end surface) 4*f*.

The incidence section 7 has a first incidence surface 7*a* at a position facing the light source 2. The first incidence surface 7*a* has a substantially conical shape that is rotationally symmetrical about an optical axis AX of the light L emitted from the light source 2, and is formed to protrude from the back surface 4*a* of the first light guide section 4. In the incidence section 7, among the light L emitted from the light source 2, the light L entering the first light guide section 4 from the first incidence surface 7*a* is condensed closer to the optical axis toward the first reflective section 8.

In addition, the incidence section 7 has a second incidence surface 7*b* around the first incidence surface 7*a*. The second incidence surface 7*b* constitutes a Fresnel lens surface that is rotationally symmetrical about the optical axis AX of the light L emitted from the light source 2. In the incidence section 7, among the light L emitted from the light source 2, the light L entering inside of the first light guide section 4 from the second incidence surface 7*b* is condensed closer to the optical axis toward the surroundings of the first reflective section 8.

The first reflective section 8 has a reflective surface 8*a* at a position facing the first incidence surface 7*a*. The reflective surface 8*a* has a substantially conical shape that is rotationally symmetrical about the optical axis AX of the light L emitted from the light source 2, and is formed by hollowing the front surface 4*b* of the first light guide section 4. That is, the reflective surface 8*a* is constituted by a conical surface that is disposed at a position facing the first incidence surface 7*a* and that is inclined at an angle of about 45° with respect to the optical axis AX of the light L emitted from the light source 2.

In the first reflective section 8, the light L entering the reflective surface 8*a* is internally reflected (totally reflected) toward the end surfaces 4*c* to 4*f* of the first light guide section 4. Accordingly, the light L reflected by the first reflective section 8 (the reflective surface 8*a*) is radially guided toward the end surfaces 4*c* to 4*f* of the first light guide section 4.

In addition, the light L entering inside of the first light guide section 4 from the second incidence surface 7*b* is radially guided toward the end surfaces 4*c* to 4*f* of the first light guide section 4 while repeating internal reflection between the front surface 4*b* and the back surface 4*a* of the first light guide section 4.

The second reflective section 9 has a first step section 12 and a second step section 13. The first step section 12 and the second step section 13 are formed on the first end surface 4*e* that is cut out in substantially a V shape that sandwiches a division line D extending parallel to a second end surface 4*c* and a third end surface 4*d* from the optical axis AX of the light L emitted from the light source 2 when the first light guide section 4 is seen from the front surface 4*b* side.

Among these, the first step section 12 has a plurality of step surfaces 12*a* substantially parallel to a traveling direction of the light L guided toward the first end surface 4*e* which is on the upper side with respect to the division line D, and a plurality of inclined surfaces 12*b* that are disposed between the plurality of step surfaces 12*a* and that are inclined in the same direction with each other. In the first step section 12, the light L entering each of the inclined surfaces 12*b* is internally reflected (totally reflected) toward the second end surface 4*c* (upward). Accordingly, the light L reflected by the first step section 12 (each of the inclined surfaces 12*b*) is guided substantially parallel to each other toward the second end surface 4*c* of the first light guide section 4.

Meanwhile, the second step section 13 has a plurality of step surfaces 13*a* substantially parallel to the traveling direction of the light L guided toward the first end surface 4*e* which is on the lower side with respect to the division line D, and a plurality of inclined surfaces 13*b* that are disposed between the plurality of step surfaces 13*a* and that are inclined in the same direction with each other. In the second step section 13, the light L entering each of the inclined surfaces 13*b* is internally reflected (totally reflected) toward the third end surface 4*d* (downward). Accordingly, the light L reflected by the second step section 13 (each of the inclined surfaces 13*b*) is guided substantially parallel to each other toward the third end surface 4*d* of the first light guide section 4.

The two third reflective sections 10 are constituted by a plurality of inclined surfaces 10*a* obtained by inclining the second end surface 4*c* and the third end surface 4*d* toward the second light guide sections 5 at an angle of about 45° with respect to the traveling direction of the light L guided toward the second end surface 4*c* and the third end surface 4*d*.

In the third reflective sections 10, the light L entering the inclined surfaces 10*a* is internally reflected (totally reflected) toward the second light guide sections 5. Accordingly, the light L reflected by the third reflective sections 10 (the inclined surfaces 10*a*) enters the second light guide sections 5 and is guided toward the front of the second light guide sections 5 (rear side of the vehicle).

The fourth reflective section 11 is constituted by a plurality of inclined surfaces 11 a obtained by inclining the fourth end surface 4*f* toward the third light guide section 6 at an angle of about 45° with respect to the traveling direction of the light L guided toward the fourth end surface 4*f*.

In the fourth reflective section 11, the light L entering the inclined surfaces 11*a* is internally reflected (totally reflected) toward the third light guide section 6. Accordingly, the light L reflected by the fourth reflective section 11 (the inclined surfaces 11*a*) enters the third light guide section 6, and is guided toward the front of the third light guide section 6 (rear side of the vehicle).

The second light guide sections 5 and the third light guide section 6 have light emission sections 14 on end surfaces (front surfaces) 5*a* and 6*a* opposite to the side facing the first light guide section 4. The light emission sections 14 constitute a light emitting surface E of the light guide body 3 that continues between the two second light guide sections 5 and the third light guide section 6. Specifically, two second light guide sections 5 and the third light guide section 6 are continuously arranged with each other, and first light emission sections 141 of the two second light guide sections 5 and a second light emmision section 142 of the third light guide section 6 consists a continuous light emitting surface E.

A plurality of reflection cuts 14*a* configured to diffuse the light L emitted from the light emission sections 14 are formed on the light emission sections 14. The plurality of reflection cuts 14*a* is constituted by arranging groove sections, which are formed by cutting out the end surfaces 5*a* and 6*a* of the second light guide sections 5 and the third light guide section 6 in the thickness direction of the second light guide sections 5 and the third light guide section 6, in the extending direction of the end surfaces 5*a* and 6*a*. In addition, the plurality of reflection cuts 14*a* controls a degree of diffusion of the light L emitted from the light emission sections 14 according to a shape of the light emitting surface E in order to substantially uniformly emit the light emitting surface E of the light guide body 3.

Further, the reflection cuts 14*a* may be configured by forming a concavo-convex shape that diffuses the light L emitted from the light emission sections 14 by performing, for example, emboss processing or the like on the end surfaces 5*a* and 6*a* of the second light guide sections 5 and the third light guide section 6 without being limited to the shape of the above-mentioned groove section.

In the light emission sections 14, the light L entering the second light guide sections 5 and the third light guide section 6 is emitted to the outside of the second light guide sections 5 and the third light guide section 6. Accordingly, the light can be emitted from the light emitting surface E of the light guide body 3 toward the front of the lighting tool 1 for a vehicle (rear side of the vehicle).

In the lighting tool 1 for a vehicle of the embodiment having the above-mentioned configuration, the light L guided toward the first end surface 4*e* of the above-mentioned first light guide section 4 is reflected toward the second end surface 4*c* and the third end surface 4*d* of the first light guide section 4 by the second reflective section 9 (the plurality of inclined surfaces 12*b* and 13*b*).

In this case, on a side (a left side) in which an optical path length from the incidence section 7 of the second light guide sections 5 to the light emission sections 14 is long, it is possible to increase a light quantity for emitting the light emitting surface E. Accordingly, it is possible to emit the light emitting surface E of the light guide body 3 more uniformly while suppressing occurrence of luminance (emission) unevenness due to a difference in the optical path lengths of the light L, which is emitted from the one light source 2, guided from the incidence section 7 to the light emission sections 14.

Further, in the lighting tool 1 for a vehicle of the embodiment, in order to uniformly emit the entire region of the light emitting surface E, the optical path lengths of the light L guided from the incidence section 7 to the light emission sections 14 are adjusted to be substantially equal.

Specifically, the second reflective section 9 has the above-mentioned substantially V shape such that such that a distance between the first step section 12 and the second end surface 4*c* and a distance between the second step section 13 and the third end surface 4*d* are gradually decreased in a direction from the incidence section 7 toward the first end surface 4*e*.

In addition, the second light guide sections 5 has the above-mentioned substantially triangular shape such that distances between the second end surface 4*c*, the third end surface 4*d* and the light emission sections 14 in a direction from the incidence section 7 toward the first end surface 4*e* are gradually decreased.

Accordingly, since the optical path lengths of the light L guided to the light emission sections 14 from the incidence section 7 of the light L emitted from the one light source 2 are substantially equal, the light emitting surface E of the light guide body 3 can be more uniformly emitted.

Further, the present invention is not limited to the embodiment and various modifications may be made without departing from the scope of the present invention.

For example, in the lighting tool 1 for a vehicle, a shape or the like of the light guide body 3 can be appropriately varied according to a design or the like the vehicle in actuality. For example, a configuration like the light guide body 3A shown in FIG. 5A or the light guide body 3B shown in FIG. 5B may be provided. Further, in the light guide bodies 3A and 3B, the same portions as the light guide body 3 are designated by the same reference numerals in the drawings while description thereof is omitted.

Specifically, the light guide body 3A shown in FIG. 5A has a configuration in which the two second light guide sections 5 are formed to protrude from the end surfaces (the second and third end surfaces) 4*c* and 4*d* disposed on the upper side and the lower side of the first light guide section 4 among the four (upper, lower, left and right) end surfaces 4*c* to 4*f* that constitute the profile of the first light guide section 4, and the first step section 12 and the second step section 13 that constitute the second reflective section 9 are formed on the end surfaces (the first and fourth end surfaces) 4*e* and 4*f* disposed on the left side and the right side of the first light guide section 4.

Accordingly, the light guide body 3A has a shape in which the two light emitting surfaces E are arranged in parallel. In the light guide body 3A, like the light guide body 3, the light emitting surface E of the light guide body 3A can be uniformly emitted while suppressing occurrence of luminance (emission) unevenness due to a difference in the optical path length of the light L, which is emitted from the one light source 2, guided from the incidence section 7 to the light emission sections 14.

Meanwhile, the light guide body 3B shown in FIG. 5B has a configuration in which the two second light guide sections 5 are formed to protrude and to continue from a second end surface 4*h* and a third end surface 4*i* that are neighbored while having a first end surface 4*g* sandwiched therebetween, among the three end surfaces 4*g*, 4*h* and 4*i* that constitute the profile of the first light guide section 4, and in which the first step section 12 and the second step section 13 that constitute the second reflective section 9 are provided on the first end surface 4*g*.

Accordingly, the light guide body 3B has a shape in which a section between the two light emitting surfaces E is folded (a dogleg shape). In the light guide body 3B, like the light guide body 3, the light emitting surface E of the light guide body 3B can be uniformly emitted while suppressing occurrence of luminance (emission) unevenness due to a difference in the optical path length of the light L, which is emitted from the one light source 2, guided from the incidence section 7 to the light emission sections 14.

In addition, a light emitting element such as a laser diode (LD) or the like, in addition to the above-mentioned LED, may be used as the light source 2 as long as the light L is radially emitted. In addition, a color of the light emitted from the light emitting element is not limited to the above-mentioned red light and may be appropriately changed with white light, orange light, or the like, according to a use of the light source 2.

In addition, while the light guide body 3 is configured by integrating the one first light guide section 4 and the three second light guide sections 5, some of these may be configured as split parts. For example, the first light guide section 4 and the second light guide sections 5, which are split parts, may be integrally combined to form the light guide body 3.

Further, while the case in which the present invention is applied to the vehicle lamp such as the tail lamp or the like, which is described above, has been described in the embodiment, when the tail lamp is provided, in addition to the light source 2 or the light guide body 3, 3A or 3B serving as the inner lens, for example, combination with another member such as an outer lens, a reflector, an extension, or the like, are also possible.

In addition, the vehicle lamp to which the present invention is applied is not limited to the above-mentioned tail lamp (tail light), and the present invention may be widely applied to vehicle lamp including a light source and a light guide body, for example, a head lamp (headlight) for a vehicle, a width indicator (a position lamp), an auxiliary head lamp (a sub headlight), a front section (a rear section) fog light (fog lamp), a daytime lighting (daytime running) lamp, a lid lamp, a brake lamp (a stop lamp), a back lamp, a direction indicator (winker lamp), or the like.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle lamp comprising:

a light source; and a light guide body configured to guide light from the light source, wherein the light guide body has a first light guide section disposed to have one surface facing the light source, and a second light guide section formed to protrude from an end surface that constitutes a profile of the first light guide section toward a side opposite to a side facing the light source, the first light guide section includes an incidence section formed on the one surface, a first reflective section provided on a surface facing the incidence section, a second reflective section and a third reflective section provided on the end surface, the second reflective section is formed on a first end surface that is a part of the end surface of the first light guide section and that is located at an end surface of the first light guide section disposed at a region different from a region where the second light guide section is protruding, the third reflective section is formed on a second end surface and a third end surface that are a part of the end surface of the first light guide section and that are located at the region the second light guide section is protruding, the first end surface is disposed between the second end surface and the third end surface, the second light guide section is provided in a plate shape extending from the first light guide section toward a light emitted direction from the light source and includes a first light emission section provided on an end part of the second light guide section at a front side of the light emitted direction, the second reflective section includes a reflective surface that internally reflects a part of the light emitted from the light source, which is reflected at the first reflective section after entering inside of the first light guide section from the incidence section, toward at least one of the second end surface and the third end surface, the third reflective section includes a reflective surface that internally reflects a part of the light emitted from the light source, which is reflected at the first reflective section after entering inside of the first light guide section from the incidence section, toward the first light emission section through inside of the second light guide section, the first light emission section serves as a light emitting surface, the second reflective section has a first step section including a plurality of inclined surfaces configured to reflect some of the light that enters the first end surface toward the second end surface, and a second step section including a plurality of inclined surfaces configured to reflect some of the light entering the first end surface toward the third end surface, the second reflective section has a shape in which a distance between the first step section and the second end surface and a distance between the second step section and the third end surface are gradually decreased in a direction from the incidence section toward the first end surface, and the second light guide section has a shape in which distances between the second end surface and the first light emission section and the third end surface and the light emission section are gradually decreased in the direction from the incidence section toward the first end surface.

2. The vehicle lamp according to claim 1, wherein the distance is adjusted such that optical path lengths of the light guided from the incidence section to the first light emission section are substantially equal.

3. The vehicle lamp according to claim 1, wherein a plurality of reflection cuts are formed on the first light emission section.

4. The vehicle lamp according to claim 1, wherein the second light guide section has a shape in which distances between the second end surface and the first light emission section and the third end surface and the light emission section are gradually decreased in the direction from the incidence section toward the first end surface.

5. The vehicle lamp according to claim 1, wherein the second light guide section is disposed above and below the light source in a front view of the vehicle lamp.

6. A vehicle lamp comprising:

a light source; and a light guide body configured to guide light from the light source, wherein the light guide body has a first light guide section disposed to have one surface facing the light source, and a second light guide section formed to protrude from an end surface that constitutes a profile of the first light guide section toward a side opposite to a side facing the light source, the first light guide section includes an incidence section formed on the one surface, a first reflective section provided on a surface facing the incidence section, a second reflective section and a third reflective section provided on the end surface, the second reflective section is formed on a first end surface that is a part of the end surface of the first light guide section and that is located at an end surface of the first light guide section disposed at a region different from a region where the second light guide section is protruding, the third reflective section is formed on a second end surface and a third end surface that are a part of the end surface of the first light guide section and that are located at the region where the second light guide section is protruding, the first end surface is disposed between the second end surface and the third end surface, the second light guide section is provided in a plate shape extending from the first light guide section toward a light emitted direction from the light source and includes a first light emission section provided on an end part of the second light guide section at a front side of the light emitted direction, the second reflective section includes a reflective surface that internally reflects a part of the light emitted from the light source, which is reflected at the first reflective section after entering inside of the first light guide section from the incidence section, toward at least one of the second end surface and the third end surface, the third reflective section includes a reflective surface that internally reflects a part of the light emitted from the light source, which is reflected at the first reflective section after entering inside of the first light guide section from the incidence section, toward the first light emission section through an inside of the second light guide section, the first light emission section serves as a light emitting surface, the light guide body further comprises a third light guide section formed to protrude from an end surface consisting the profile of the first light guide section toward the side opposite to the side facing the light source, and a fourth reflective section provided at the end surface of the first light guide section, the fourth reflective section is formed at a position different from where the first end surface is formed and is formed at a fourth end surface located at a region where the third light guide section is protruding, the third light guide section is formed in a plate shape extending from the first light guide section toward a light emitted direction from the light source and includes a second light emission section provided on an end part of the third light guide section at the front side of the light emitted direction, the second light guide section and the third light guide section are integrally formed, and the first light emission section and the second light emission section forms a continuous light emitting surface.

7. The vehicle lamp according to claim 6, wherein a plurality of reflection cuts are formed on the second light emission section.

8. The vehicle lamp according to claim 6, wherein the second light guide section is disposed above and below the light source in a front view of the vehicle lamp.

9. The vehicle lamp according to claim 8, wherein the third light guide section is disposed at a side of the light source in the front view of the vehicle lamp.

* * * * *